March 12, 1957
H. ALLEMANN
2,784,430
TOOL SPINDLE ROTATED IN ALTERNATE DIRECTIONS
BY MEANS OF RECIPROCATING RACK AND
PINION DRIVE
Filed Nov. 16, 1951
4 Sheets-Sheet 1
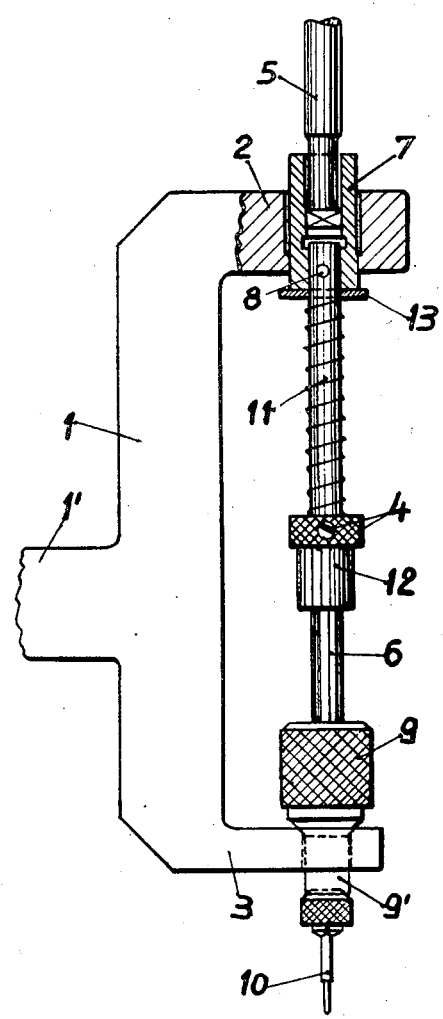
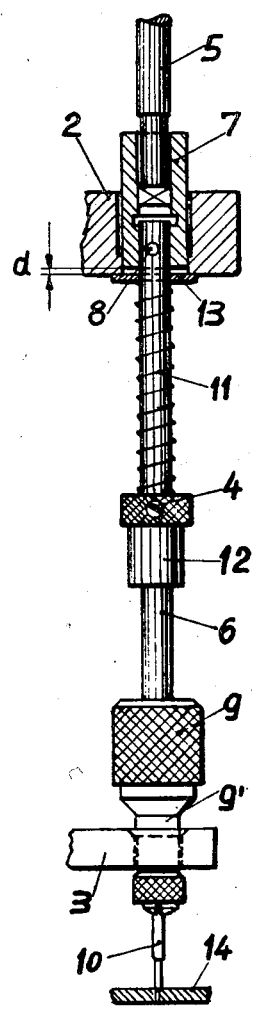
*Inventor:*
Hugo Allemann

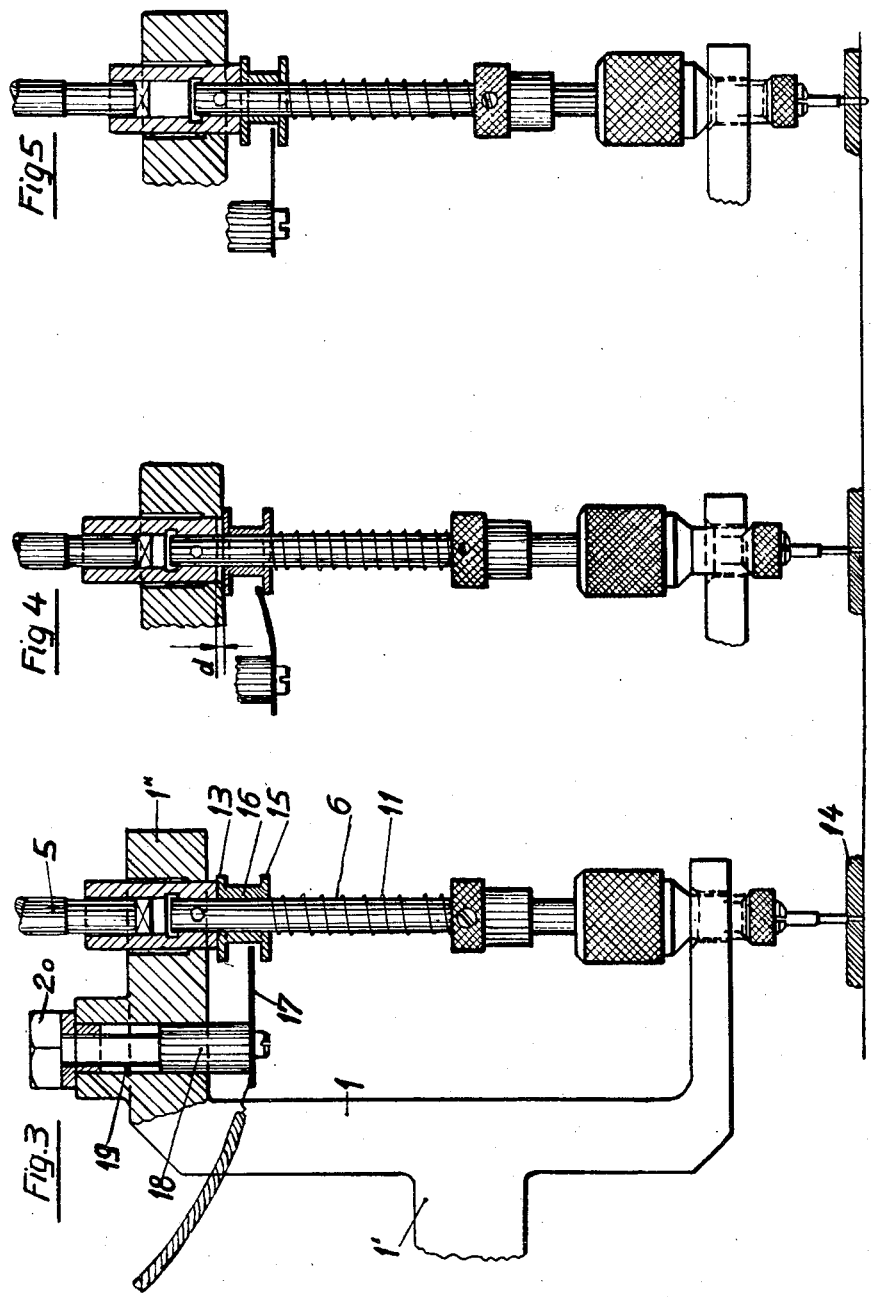

March 12, 1957

H. ALLEMANN 2,784,430

TOOL SPINDLE ROTATED IN ALTERNATE DIRECTIONS
BY MEANS OF RECIPROCATING RACK AND
PINION DRIVE

Filed Nov. 16, 1951

Inventor:
Hugo Allemann

United States Patent Office 2,784,430
Patented Mar. 12, 1957

2,784,430

TOOL SPINDLE ROTATED IN ALTERNATE DIRECTIONS BY MEANS OF RECIPROCATING RACK AND PINION DRIVE

Hugo Allemann, Luterbach, Solothurn, Switzerland, assignor to Hugo Allemann Aktiengesellschaft, Solothurn, Switzerland, a firm Application November 16, 1951, Serial No. 256,724

3 Claims. (Cl. 10—138)

This invention relates to a method of and an arrangement for machine tapping.

In machine tapping where the tap is fixed in a holder and the drilling spindle may be alternately driven in one or the other direction by a reversing gear, means are usually provided for exerting an axial thrust upon the revolving machine spindle to facilitate action by the tap on the material of the work. When the desired depth of thread has been reached, all that is done is to change the direction of rotation of the spindle, and the tap then unscrews itself again on its return travel.

Threads made in this manner suffer, however, from the drawback that part of the first thread formed in the work, i. e., of the thread which finally remains in contact with the returning tap, is easily deformed by further turning of the tap after its return travel has come to a stop. The result is that screws can be inserted only with difficulty in the finished work, and often much trouble is caused by the efforts to make the screws grip. Apart from the extra time required for mounting, these operations damage of course the threaded hole.

According to the invention, the disadvantages mentioned are overcome by providing for pressureless tapping over the largest part of the hole, and particularly during the return travel of the tap. The method proposed by the invention consists in applying to the work an inoperative tap and subjecting it to pressure in addition to weight. This additional pressure drops to zero when the rotating tap has penetrated the work to an extent permitting unaided continuation of its cutting action. After the predetermined depth has been reached, the direction of rotation of the tap is altered which on its return travel carries out exactly the same number of revolutions as during the preceding cutting action and, when at a standstill, is finally lifted off from the work in the direction of the axis of the hole.

A further object of the invention is an arrangement for carrying out the method described. The features of this arrangement are that the tapping spindle of the machine is subdivided into an upper and a lower member, the upper member turning at the same place and driving the lower member in an axially displaceable manner by means of a sliding clutch. The lower member is equipped with an elastic pressure device adapted to exert an axial thrust upon the tap over an adjustably limitable portion of the depth of thread.

Some embodiments of the invention are illustrated, by way of example, in the accompanying drawing, wherein Figure 1 shows a drilling spindle arranged for tapping in a position of rest;

Fig. 2 shows the same drilling spindle in a position at which the tap, directly before operation begins, is applied to the work under pressure in addition to weight;

Figs. 3 to 5 show the drilling spindle combined with an electric contact device for actuating a safety device at various working phases;

Figure 6:
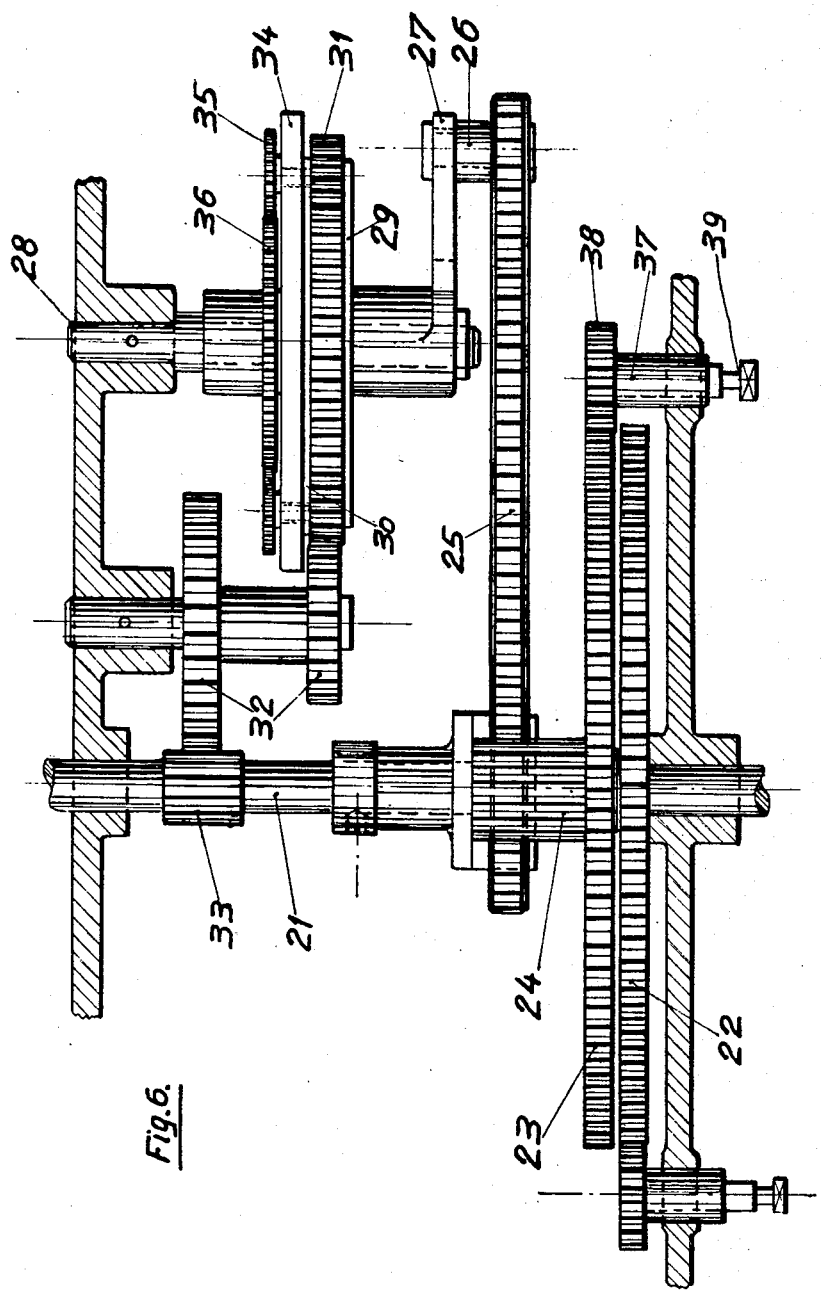
Fig. 6 is a side view of the reversing gear.
Figure 7:
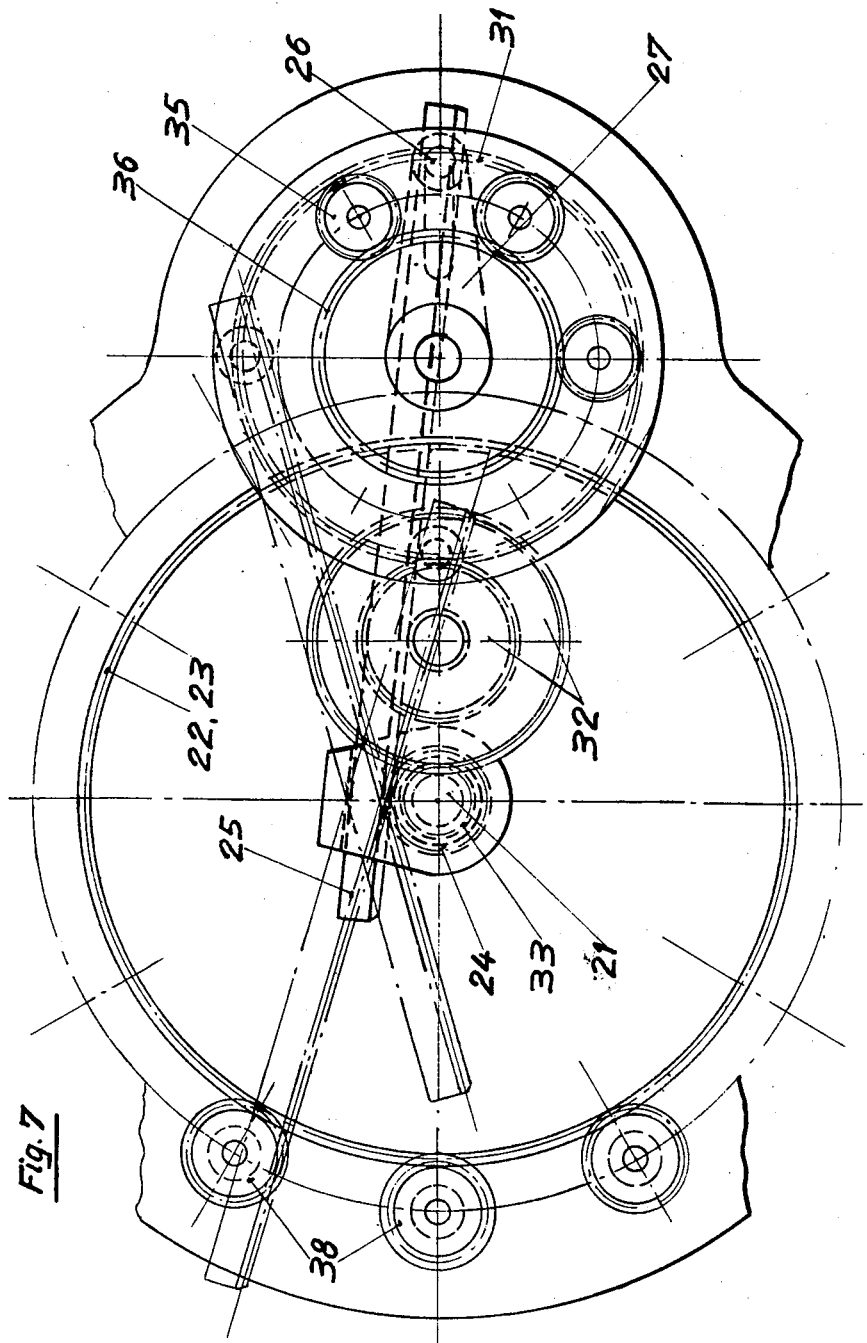

Fig. 7, a top view thereof.

Referring to the drawing, a spindle holder 1 movable in the direction of the spindle axis is connected with a drilling machine, not shown, by a partly shown arm 1' and possesses an upper and a lower spindle guide 2, 3 in which the drilling spindle is rotatably disposed. The drilling spindle comprises an upper member 5 rotating at the same place and a lower member 6 which, during rotation, is simultaneously axially displaceable in both spindle guides 2, 3; for this purpose both spindle members 5, 6 are coupled together by a sliding clutch 7. One end of the clutch 7 is firmly connected to the lower spindle member 6 by a cross pin 8 or the like, and the other end is fitted with an axial bore of square cross-section engaged in an easily slidable manner by the square end of the upper spindle member 5. It would be possible of course to employ a sliding clutch of different construction without affecting the invention. For the sake of stability, the clutch 7 may be arranged in the upper spindle guide 2, though this is not a necessity, so as to enable it during operation simultaneously to rotate in the guide and to slide on the driving upper spindle member 5 without influencing it.

The lower end of the spindle member 6 supports a drill chuck 9 having a cylindrical extension 9' rotatably and axially displaceably disposed in the lower spindle guide 3. In the drill chuck 9 a tap 10 is inserted. Between the cylindrical extension 9' and the guide 3 some radial play may be advantageously provided to permit radial motion of the lower spindle member within certain limits. During threading this arrangement has the effect to facilitate alignment of the tap relatively to the bottom hole.

The lower spindle member 6 is provided with a compression spring 11 the lower end of which lies against a stop 12, and the upper end exerts pressure in upward direction upon a movably arranged pressure disc 13. In the position of rest of the drilling spindle shown in Fig. 1 the pressure disc 13 bears against the lower end of the sliding clutch 7 and is therefore inactive. In the position shown in Fig. 2 the spindle holder 1 is, however, lowered to a certain extent until the tap 10 rests upon the work 14, the upper spindle guide 2 is seated on the pressure disc 13, depresses it to an adjustable degree $d$ and thus tensions the pressure spring 11. In this way, initial pressure, in addition to the action of the weight of the lower spindle member 6, is imparted to the tap 10. Depending on the nature of the work, more or less initial pressure may be required, and for this reason the stop 12 is rendered adjustable by being constructed as a fixable slide. For locking the slide in position a set screw 4 or other suitable means may be provided.

During the descent of the rotating spindle member 6 in a tapping operation the first part $d$ of its travel is performed under additional spring pressure until the sliding clutch 7 rests on the pressure disc 13. This arrangement insures a reliable starting cut of the tap. Throughout the remaining travel to the predetermined depth the tap 10 is loaded only by the weight of the spindle member 6. This load is sufficient to enable the tap to dependably finish cutting of the remainder of the work without additional pressure. While these operations are going on the upper spindle member 5 does not vary its position, that is, it always turns on the spot, whereas the lower spindle member 6 is capable of axial displacement with the sliding clutch 7.

The upper spindle member 5 is driven alternately in both directions, as required, by an automatic reversing gear. As the number of revolutions of the tap determines the depth of thread cut, the reversing gear is equipped for accurately adjusting this number in both directions of rotation. Furthermore, the reversing gear is so arranged that the spindle cannot turn until the tap 10, in inoperative condition, has approached the work Having described our invention, what we claim as new and desire to secure by Letters Patent is:

1. A mechanical action for artificial limb joints comprising a relatively stationary member and a ratchet segment rotatably mounted on the member, a lever rotatably mounted on the member with the rotational axis adjacent to the circumference of the ratchet segment, a locking bar on said lever having opposite curved faces positioned generally perpendicular to the radius from the rotational axis of the lever, said segment having a series of spaced generally radially extending bar receiving notches with faces complementary to the respective faces of the bar when in bar receiving position, said rotational axis of the lever being at a point adjacent a line tangent to an arc about the axis of said segment struck through the centers of the faces of said notch.

2. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite faces positioned generally perpendicular to the radius from the rotational axis of the lever and the faces, said segment being subject to a rotative load and having a series of spaced generally radially extending bar receiving notches with faces complementary to the respective faces of the bar when in bar receiving position, said rotational axis of the lever being within an angular distance of a line tangent to an arc about the axis of said segment struck through the centers of the faces of said notch such that the component of the force resulting from application of a rotative load tending to disengage the bar from the notch is less than the frictional force on the respective contacting faces.

3. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces positioned generally perpendicular to the radius from the rotational axis of the lever and the faces, said segment having a series of spaced generally radially extending bar receiving notches with arcuate faces complementary to the respective faces of the bar when at bar receiving position, said rotational axis of the lever being within an angular distance of five degrees inside of a line tangent to an arc about the axis of said segment struck through the centers of the faces of said notch.

4. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces of radius of curvature determined by the distance between the rotational axis of the lever and the respective face, said segment having a series of spaced generally radially extending bar receiving notches with arcuate faces complementary to the respective faces of the bar, said rotational axis of the lever being at a point within an angular distance of 15 degrees on either side of a line tangent to an arc centered at the axis of said segment and through the centers of the faces of a notch in bar engaging position, the faces of said notches having positions wherein said last faces are in engagement substantially throughout their areas with the respective faces of the bar when in bar engaging position.

5. A mechanical action for artificial limb joints comprising a pair of members wherein one member is adapted for attachment to a natural limb, parallel plates on one of the members, the other of said members comprising a tubular sleeve rotatably mounted on said plates providing thereby an articulating joint for said action, a ratchet segment fixed on said sleeve having a series of spaced generally radially extending notches, a lever pivotally mounted at a center of rotation on said one member, a locking bar fixed transversely on the lever, and an alternator connected between the lever and one of said members adapted to releasably hold said bar out of notch engagement position, said bar having opposite notch contacting faces curved in the same general direction and said notches having opposite curved bar engaging faces complementary to and adapted to engage the respective faces of the bar when in bar engaging position.

6. A mechanical action for artificial limb joints comprising a relatively stationary member adapted for attachment to a natural limb, parallel plates on said member and a tubular sleeve rotatably mounted on said plates providing thereby an articulating joint for said action, a ratchet segment fixed on said sleeve having a series of spaced generally radially extending notches, a lever pivotally mounted at a center of rotation on said member, a locking bar fixed transversely on the lever, a spring on said member normally urging said bar toward a notch engagement position, and an alternator connected between said member and the lever adapted to releasably hold said bar out of notch engagement position, said bar having opposite notch contacting faces of arcuate form and of radius determined by the distance between the respective face and said center of rotation of the lever, said notches having opposite bar engaging faces of arcuate form complementary to and adapted to engage the respective faces of the bar when in bar engaging position.

7. A ratchet resistant mechanical action for artificial limb joints comprising a base, a ratchet segment rotatably mounted on the base and a locking bar having a pivotal mounting on said base, said locking bar having opposite segment-engaging faces curved in the same general direction about the axis of said pivotal mounting, said segment having a series of peripheral bar receiving notches with opposite faces respectively complementary to the faces on said bar.

References Cited in the file of this patent

UNITED STATES PATENTS 2,637,042     Threewit                May 5, 1953

FOREIGN PATENTS 303,664       Germany                Feb. 11, 1918

The gears 38 are disengaged from the gear 22 and brought into engagement with the gear 23, or vice versa, by hand while the machine stops.

The depth of thread or the number of threads to be cut into the holes can be accurately adjusted by varying the length of the crank arm 27.

I claim:

1. Driving apparatus comprising, in combination, support means; a drive shaft supported for rotation about its axis by said support means; a first gear coaxial with said drive shaft and fixed thereto for rotation therewith; a second gear carried by said drive shaft for free rotation thereabout, said second gear being coaxial with said first gear and being of the same diameter; reciprocating means operatively connected to said second gear for angularly reciprocating the same about said drive shaft; a spindle supported by said support means for axial movement in a direction parallel to said drive shaft, said spindle being located beside said first gear; and a pinion fixed to said spindle and shiftable therewith for alternate meshing with said first or said second gear so that said spindle may be rotated in one direction when said pinion meshes with said first gear or reciprocated angularly about its axis when said pinion meshes with said second gear.

2. Driving apparatus comprising, in combination, support means; a drive shaft supported for rotation about its axis by said support means; a first gear coaxial with said drive shaft and fixed thereto for rotation therewith; a second gear carried by said drive shaft for free rotation thereabout, said second gear being coaxial with said first gear and being of the same diameter; reciprocating means operatively connected to said second gear for reciprocating the same about said drive shaft; a spindle supported by said support means for axial movement in a direction parallel to said drive shaft, said spindle being located beside said first gear; a pinion fixed to said spindle and shiftable therewith for alternate meshing with said first or said second gear so that said spindle may be rotated in one direction when said pinion meshes with said first gear or reciprocated angularly about its axis when said pinion meshes with said second gear; and adjusting means operatively connected to said reciprocating means for adjusting the extent to which the latter reciprocates said second gear.

3. A combined tapping and drilling apparatus comprising, in combination, elongated means for holding a tap or drill and for transmitting a rotational drive thereto; combined guiding and supporting means engaging said elongated means for supporting the same and for guiding said elongated means for axial and rotational movement during cutting of a thread without applying to a tap any force in addition to the weight of said elongated means and the tap itself; drive means operatively connected to said elongated means for transmitting a rotational drive thereto; support means supporting said drive means for shifting movement between a drilling position and a tapping position; elongated shaft means adapted to be rotated by a motor; first gear means engaging said drive means when the latter is in said drilling position for rotating said elongated means in one direction said first gear means comprising a first gear wheel concentrically and fixedly connected to said shaft means for rotation in one direction therewith; and second gear means engaging said drive means when the latter is in its tapping position for automatically turning said elongated means through a given angle in one direction and then back through the same angle in an opposite direction, said second gear means including a second gear wheel engaging said drive means and being loosely and concentrically arranged around said shaft means for rotation relative to the latter, said second gear means also including reciprocating rack means engaging said second gear wheel for rotating the latter through a certain angle in one direction and then back through the same angle in an opposite direction, said second gear means further including means operatively engaging said shaft means and being driven thereby for reciprocating said rack means.

References Cited in the file of this patent
UNITED STATES PATENTS

| | | |
|---|---|---|
| 1,564,353 | Johnson | Dec. 8, 1925 |
| 1,861,350 | Mansfield | Mar. 31, 1932 |
| 1,936,665 | Gauthier | Nov. 28, 1933 |
| 1,962,894 | Danielson | June 12, 1934 |
| 2,070,463 | Allemann | Feb. 9, 1937 |
| 2,286,088 | Harrell | June 9, 1942 |
| 2,377,659 | Zeichner | June 5, 1945 |
| 2,450,238 | Jordan | Sept. 28, 1948 |